(12) United States Patent
Zhao

(10) Patent No.: US 10,831,769 B2
(45) Date of Patent: Nov. 10, 2020

(54) SEARCH METHOD AND DEVICE FOR ASKING TYPE QUERY BASED ON DEEP QUESTION AND ANSWER

(71) Applicant: Beijing Baidu Netcom Science And Technology Co., Ltd., Beijing (CN)

(72) Inventor: Ximo Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 309 days.

(21) Appl. No.: 15/648,877

(22) Filed: Jul. 13, 2017

(65) Prior Publication Data

US 2018/0181573 A1 Jun. 28, 2018

(30) Foreign Application Priority Data

Dec. 27, 2016 (CN) .......................... 2016 1 1222771

(51) Int. Cl.
*G06F 17/00* (2019.01)
*G06F 16/2457* (2019.01)
(Continued)

(52) U.S. Cl.
CPC .... *G06F 16/24578* (2019.01); *G06F 16/2455* (2019.01); *G06N 3/04* (2013.01);
(Continued)

(58) Field of Classification Search
CPC .......... G06F 16/24578; G06F 16/9535; G06F 16/337; G06F 15/16; G06F 16/24575
See application file for complete search history.

(56) References Cited

U.S. PATENT DOCUMENTS

| | | | | |
|---|---|---|---|---|
| 2008/0010259 | A1* | 1/2008 | Feng | G06F 16/9537 |
| 2016/0232368 | A1* | 8/2016 | Clark | G06F 16/367 |
| 2016/0259863 | A1* | 9/2016 | Allen | G06F 16/90332 |

FOREIGN PATENT DOCUMENTS

| | | |
|---|---|---|
| CN | 104636465 A | 5/2015 |
| CN | 105975639 A | 9/2016 |

OTHER PUBLICATIONS

Chinese Patent Application No. 201611222771.0, Office Action dated Aug. 19, 2019, 8 pages.
(Continued)

*Primary Examiner* — Truong V Vo
(74) *Attorney, Agent, or Firm* — Lathrop GPM LLP

(57) ABSTRACT

The present disclosure provides a search method and device for asking type query based on deep question and answer, in which the method includes: after determining that the query is an asking type query by identifying the query, searching page information matching the query from a database, performing multi-characteristic analysis on the page information according to characteristics, to obtain characteristic score of each of the characteristics, ranking the page information according to the characteristic score of each of the characteristics, and displaying ranked page information. A plurality of characteristics are used for evaluating effectiveness of the page information to answer the question raised by the query from a plurality dimensions, thus page information that can answer the question raised by the query is displayed to the user, avoiding a process for searching one by one of the user, and solving the technical problem of low search efficiency in related art.

22 Claims, 3 Drawing Sheets

(51) Int. Cl.
*G06N 3/04* (2006.01)
*G06N 20/00* (2019.01)
*G06F 16/2455* (2019.01)
*G06N 5/04* (2006.01)

(52) U.S. Cl.
CPC ............ *G06N 3/0454* (2013.01); *G06N 5/04* (2013.01); *G06N 20/00* (2019.01)

(56) References Cited

OTHER PUBLICATIONS

Chinese Patent Application No. 201611222771.0, English translation of Office Action dated Aug. 19, 2019, 9 pages.

\* cited by examiner

How to not leave the lipstick on the glass

"An easiest method is to gently lick the outer edge of the glass before drink. As long as the lips are ensured to touch the moist part of outer edge of the glass only, lipstick will not leave on the glass edge. You can also apply a waterproof lipstick or lipstick coat."

The answer is from mingjiu.3518.cn>

SEARCH METHOD AND DEVICE FOR ASKING TYPE QUERY BASED ON DEEP QUESTION AND ANSWER

CROSS-REFERENCE TO RELATED APPLICATION

This application claims priority to and benefits of Chinese Patent Application Serial No. 201611222771.0, filed with the State Intellectual Property Office of P. R. China on Dec. 27, 2016, the entire content of which is incorporated herein by reference.

FIELD

The present disclosure relates to a field of information search technology, and more particularly to a search method and device for asking type query based on deep question and answer.

BACKGROUND

Deep question and answer means a technology which can understand languages of human, intelligently identify meaning of a question, and extract an answer to the question from a huge number of internet data.

In the information search processing in the related art, a user can set a query by himself, such that the search engine can perform a search according to the query and return a search result to the user. In operation process of the search engine, some users may raise a question as the query in some cases, that is, the query is an asking type query. In this case, the search result is often not highly relevant to the answer to the question. When the user wishes to obtain the answer to the question, the user may need to first click a relevant link in the search result to view specific content in the page, and the user may further need to summarize the answer to the question by himself. Therefore, in the related art, search efficiency is low when a search is performed according to an asking type search.

SUMMARY

Embodiments of a first aspect of the present disclosure provide a search method for asking type query based on deep question and answer, including:

identifying a query, and determining that the query is an asking type query;

searching for multiple pieces of page information matching the query in a database;

performing multi-characteristic analysis on each piece of page information according to characteristics, to obtain a characteristic score of each of the characteristics, wherein the characteristics are used to evaluate an effectiveness of each piece of page information for answering a question raised by the query;

ranking the multiple pieces of page information according to the characteristic score of each of the characteristics; and displaying the multiple pieces of page information according to a ranking result.

Embodiments of a second aspect of the present disclosure provide a search device for asking type query based on deep question and answer, including:

an identifying module, configured to identify a query, and to determine that the query is an asking type query;

a searching module, configured to search for multiple pieces of page information matching the query from a database;

an analysis module, configured to perform multi-characteristic analysis on each piece of page information according to characteristics, to obtain a characteristic score of each of the characteristics, wherein the characteristics are used for evaluating an effectiveness of each piece of page information for answering a question raised by the query;

a ranking module, configured to rank the multiple pieces of page information according to the characteristic score of each of the characteristics; and a displaying module, configured to display ranked page information.

Embodiments of a third aspect of the present disclosure provide a search device for asking type query, including: a processor; a memory for storing instructions executable by the processor; wherein the processor is configured to: identify a query, and to determine that the query is an asking type query; search for multiple pieces of page information matching the query in a database; perform multi-characteristic analysis on each piece of page information according to characteristics, to obtain a characteristic score of each of the characteristics, wherein the characteristics are used to evaluate an effectiveness of each piece of page information for answering a question raised by the query; rank multiple pieces of the page information according to the characteristic score of each of the characteristics; and to display the multiple pieces of page information according to a ranking result.

Embodiments of a fourth aspect of the present disclosure provide a non-transitory computer-readable storage medium. The non-transitory computer-readable storage medium has stored therein instructions that, when executed by a processor, causes a server to perform a search method for asking type query, the method including: identifying a query, and determining that the query is an asking type query; searching for multiple pieces of page information matching the query in a database; performing multi-characteristic analysis on each piece of page information according to characteristics, to obtain a characteristic score of each of the characteristics, wherein the characteristics are used to evaluate an effectiveness of each piece of page information for answering a question raised by the query; ranking the multiple pieces of page information according to the characteristic score of each of the characteristics; and displaying the multiple pieces of page information according to a ranking result.

Embodiments of a fifth aspect of the present disclosure provide a program product, the program product has stored therein instructions that, when executed by a processor, executes a search method for asking type query, the method including: identifying a query, and determining that the query is an asking type query; searching for multiple pieces of page information matching the query in a database; performing multi-characteristic analysis on each piece of page information according to characteristics, to obtain a characteristic score of each of the characteristics, wherein the characteristics are used to evaluate an effectiveness of each piece of page information for answering a question raised by the query; ranking the multiple pieces of page information according to the characteristic score of each of the characteristics; and displaying the multiple pieces of page information according to a ranking result.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
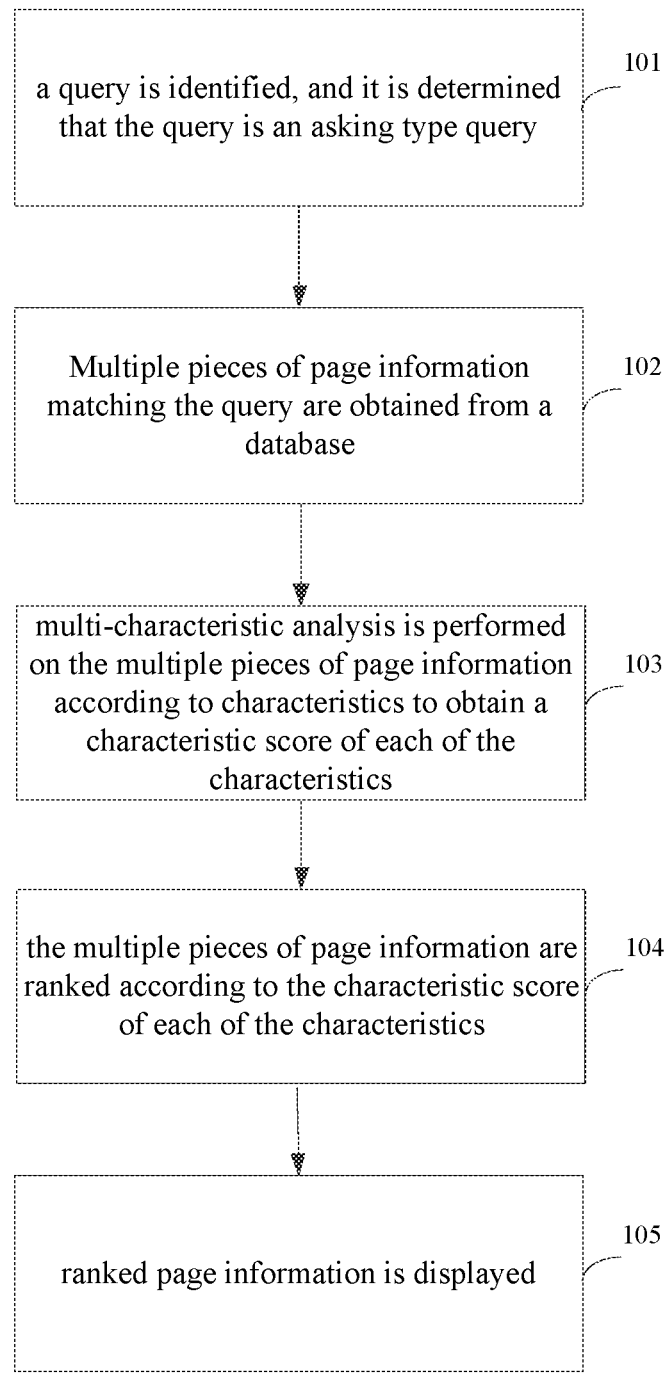
FIG. 1 is a flow chart of a search method for asking type query based on deep question and answer according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The search method and the device for asking type query based on deep question and answer according to embodiments of the present disclosure will be described below with reference to drawings. The asking type query is a query for raising a question to find an answer to the question.

FIG. 1 is a flow chart of a search method for asking type query based on deep question and answer according to an embodiment of the present disclosure.

As shown in FIG. 1, the search method for asking type query based on deep question and answer comprising following steps.

In step 101, a query is identified, and it is determined that the query is an asking type query.

Specifically, in order to determine which queries are raising questions, identification may be performed on each query. After the identification steps, it can be definitely known whether a query is an asking type query for raising a question. Specifically, it can be identified whether the query is the asking type query according to an interrogative word contained in the query, and/or a question-and-answer type ending word contained in the query, and/or a ratio of question-and-answer pages in pages matching the query.

For example, it can be judged whether a query is the asking type query mainly according to content of the query and results obtained according to the query. First, word segmentation is performed on the query, and it is judged whether the query contains an interrogative word. If the query contains an interrogative word, the query is the asking type query. If the query does not contain an interrogative word, it is further judged whether an ending word of the query is a question-and-answer type ending word having a search intention. If the query is "Henan province governor", with an ending word "governor", it can be judged that the user has a search intention for searching who is the governor of Henan province. If the ending word is not the question-and-answer type ending word, it is further judged whether there are a high portion of question-and-answer type pages in the search result. If there are a lot of question-and-answer type pages in the search result, it is indicated that a search engine judged that the user has a search intention, and the query is determined to be the asking type query.

Further, after it is definitely known whether the query is the asking type query for raising a question, more detailed information can be further identified, such as which type the raised question is, whether the answer to the raised question is unique, or the like.

Specifically, after it is identified whether the query is the asking type query, the asking type query can be further identified by using a pre-trained support vector machine model, to obtain related information such as question type of the query and/or whether an answer to the query is unique, or the like.

For example, question type of the query and/or whether an answer to the query is unique can be judged mainly by following ways. A good deal of history queries can be searched off-line and be marked, in which, a question type of each of the history queries and/or whether an answer to each of the history queries is unique are marked. The support vector machine model is trained by taking segmented words of the history queries, part-of-speech tagging of the history queries, and whether each of the history queries has an interrogative word as parameters. Question type of a current online query and whether an answer to the current online query is unique are identified based on the trained model.

It should be noted that, the question type may include how, why, when, whether and the like.

In step 102, multiple pieces of page information matching the query are obtained from a database.

Specifically, the database is an off-line database, page information recorded in the database includes: entity data obtained by performing entity extraction on pages, and/or, paragraphing data obtained by extracting paragraphs containing an answer from the pages; and/or, structured data obtained by organizing paragraphs containing an question and paragraphs containing an answer in a preset structure.

The database is previously established before performing step 101. As a possible implementation, entity extraction can be performed on whole network data, and then entity data is stored in a form of database. Moreover, with respect to hyper text markup language (HTML for short) information of a page, the page is divided into paragraphs independent with each other in terms of semantics, and paragraphs containing an answer are extracted to be paragraphing data. In addition, the structured data can be obtained by organizing questions and answers from respective question-and-answer pages in a question-and-answer type website in a preset structure.

In step 103, multi-characteristic analysis is performed on each piece of page information according to characteristics to obtain a characteristic score of each of the characteristics.

The characteristics are used for evaluating an effectiveness of the page information for answering a question raised by the query.

Specifically, the characteristics may include one or more of a deep convolution neural network (DNN for short) characteristic, a numerical characteristic, an aggregation characteristic, an entity characteristic, an alignment characteristic, a length characteristic, and a position characteristic.

In step 104, the multiple pieces of page information are ranked according to the characteristic score of each of the characteristics.

Specifically, scores of the page information are calculated by taking into account of characteristic scores of each of the characteristics, and thus the multiple pieces of page information are ranked according to the scores of the page information. The higher the score of the piece of page information is, the higher the validity of the piece of page information is, i.e., the piece of page information can effectively answer the question. On the contrary, the lower the score of the piece of page information is, the lower the validity of the piece of page information is, i.e., the piece of page information may not effectively answer the question. The piece of page information which can effectively answer the question is placed in front when ranking.

As a possible implementation, a total score of the piece of page information can be obtained by calculating a weighted sum of the characteristic scores of each of the characteristics, and the multiple pieces of page information can be ranked according to the total scores. Weights corresponding to the position characteristic and the length characteristic are degrees of search correlation for indicating a matching degree of the query and the page information.

It should be noted that, the matching degree of the query and the page information may be a literal matching degree or a semantic matching degree, which is not limited in embodiments of the present disclosure.

For example, the total score can be calculated with following formula:

$$\text{score} = w_1 \times \text{digit} + w_2 \times \text{entity} + w_3 \times \text{alignment} + w_4 \times \text{aggregation} + w_5 \times \text{dnn} + w_6 \times \text{list} + \text{sim\_score} \times (\text{pos\_weight} + \text{require\_score} + \text{len\_score}),$$

where, $w_1$, $w_2$, $w_3$, $w_4$, $w_5$, and $w_6$, are artificially specified weights corresponding to the characteristics, digit is a characteristic score of the numerical characteristic, entity is a characteristic score of the entity characteristic, alignment is a characteristic score of the alignment characteristic, aggregation is a characteristic score of the aggregation characteristic, dnn is a characteristic score of the deep convolutional neural network characteristic, list is a characteristic score of a list characteristic, sim score is the degree of search correlation, pos_weight is a characteristic score of the position characteristic, require is a question-and-answer requirement score of the user, len_score is a characteristic score of the length characteristic. The question-and-answer requirement score of the user is used to indicate an intensity degree of question-and-answer requirement of the query provided by the user. It should be explained that, in general, the higher a score is, the more significant the characteristic corresponding to the score is. For example, the higher the question-and-answer requirement of the user is, the more intensive the question-and-answer requirement of the user is.

As another possible implementation, a rank of the multiple pieces of page information may be obtained by inputting the characteristic scores of the characteristics into a ranking model pre-trained according to ranking requirement of the user.

For example, a group of artificially ranked data can be marked as samples firstly. Rank of the data satisfies the user's requirement for quality of ranked results. After the characteristic scores are obtained by performing the above characteristic analysis according to the samples, the characteristic scores are input into a ranking module to train the ranking model. Then, the characteristic scores obtained by performing characteristic analysis on the page information are input into the trained ranking model online, and then the ranking model outputs a rank of the page information.

In step 105, the multiple pieces of page information are displayed according to a ranking result.

Figures 2, 3:
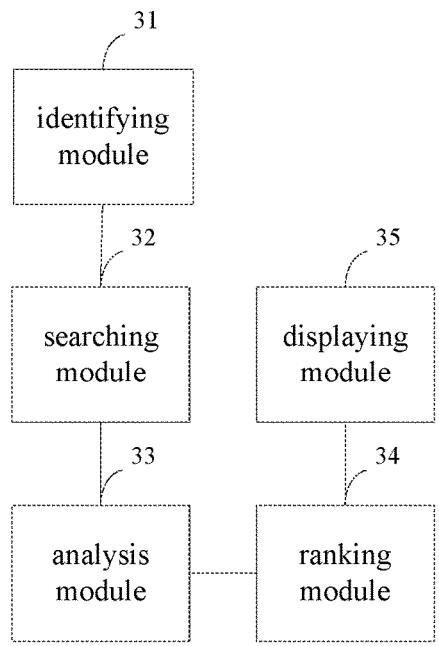
FIG. 2 is a schematic diagram of a search result.
FIG. 3 is a block diagram of a search device for asking type query based on deep question and answer according to an embodiment of the present disclosure.

Page information ranked in front is displayed on a search result page. As a possible implementation, pieces of page information top ranked can be selected and displayed as a summary on the search result page. FIG. 2 is a schematic diagram of a search result. As shown in FIG. 2, page information containing an answer can be directly displayed, thus avoiding a process of a click search of the user.

In embodiments of the present disclosure, by identifying the query, and after determining that the query is an asking type query, searching for multiple pieces of page information matching the query in the database, then performing the multi-characteristic analysis on each piece of page information according to characteristics to obtain the characteristic score of each of the characteristics, ranking the multiple pieces of page information according to the characteristic score of each of the characteristics, and displaying the multiple pieces of according to the ranking result, a plurality of characteristics are used to evaluate the effectiveness of the page information for answering the question raised by the query from a plurality of dimensions, such that page information that can answer the question raised by the query is displayed to the user, thus avoiding a one-by-one viewing process of the user, and solving the technical problem of low search efficiency in related art.

To clearly explain the above embodiment, the process for performing multi-characteristic analysis on the page information according to characteristics to obtain characteristic score of each of the characteristics in step 103 will be illustrated in detail in this embodiment.

It should be noted that, the page information here may be entity data, paragraphing data, or structured data. Reference can be made to the relative descriptions in step 102, and is not described here.

Alternatively, when the characteristic is a deep convolutional neural network characteristic, a question-answer match is performed through a deep convolutional neural network according to words in the page information and the query, to determine a first characteristic score of the page information. The deep convolutional neural network has previously learned matching degrees between questions and answers. The first characteristic score obtained by the deep convolutional neural network may be used for indicating whether the page information is answering a question.

Alternatively, when the characteristic is numerical characteristic, a numerical answer in each piece of page information is extracted according to a measuring unit when the answer to the question raised by the query is in a form of number. If the numerical answer corresponding to the query is an approximate number, single-pass clustering is performed on extracted numerical answer, and a score of each cluster is obtained. If the numerical answer corresponding to the query is a definite number, literal value clustering is performed on the extracted numerical answer, and a score of each cluster is obtained. The score of each cluster is taken as a second characteristic score of page information containing the numerical answer in each cluster.

It can be seen that, the numerical characteristic primarily focuses on judging what kind of numerical answer the user want according to the question type of the query, whose answer is a number. For example, if the query is "How many kilometers from Nanjing to Beijing", a numerical answer may be certain number of kilometers, a certain number of meters, or the like. Possible numerical answers are extracted according to unit information, and normalization is performed on units and expressions of those numerical answers. If the numerical answer corresponding to the query is an approximate number (for example, regarding how many kilometers from Nanjing to Beijing, there is not a definite distance), single-pass clustering is performed on those numerical answers. If the numerical answer corresponding to the query is a definite number (for example, how old is Liu Dehua), literal clustering is performed on those numerical answers.

Alternatively, when the characteristics include an aggregation characteristic, words contained in the page information may be scored by an algorithm (for example, text rank algorithm) of computing an appearance frequency of each of the words, to obtain a score for indicating the appearance frequency of each of the words. A third characteristic score of page information which contains the word is determined according to the score for indicating the appearance frequency of the word.

The aggregation characteristic primarily focuses on literal co-occurrence information in the answer. If the answer is definite, there may be certain words mentioned in a high frequency in the page. For example, the query is "***'s wife", appearance frequency of a name of this person's wife may be high in content of the page. Therefore, the page information containing an answer can be determined according to high frequency words.

Alternatively, when the characteristics include an entity characteristic, a search intention of a user may be estimated according to the question raised by the query, entities in the page information may be clustered according to entity data in the page information, thus judging whether those entity information can satisfy the search intention of the user, and obtaining a fourth characteristic score for indicating a degree of each entity data satisfying the search intention.

Alternatively, when the characteristic includes an alignment characteristic, the query may be aligned with paragraphs in the page information by using an alignment model, and a fifth characteristic score of page information containing the paragraphs is obtained.

The alignment model has previously learned word alignment situation of words in questions and answers.

It can be seen that, word alignment, phrase alignment and sentence alignment methods in machine translation are introduced into the search method for asking type query. Alignment characteristic between queries and answers may be learned by using the alignment model in a process of off-line training, and paragraphing data of the page information is scored online with the alignment model.

Alternatively, when the characteristic includes a length characteristic, the length characteristic of the page information may be analyzed to obtain a sixth characteristic score for indicating richness of content contained in the page information.

Alternatively, when the characteristic includes a position characteristic, the position characteristic of the page information may be analyzed to obtain a seventh characteristic score for indicating a ranking situation of the page information in all page information matching the query. All the page information is ranked according to a matching degree between the query and the page information.

It should be noted that, the length characteristic and the position characteristic may be collectively referred to as basic characteristics.

In embodiments of the present disclosure, by using a plurality of characteristics, effectiveness of the page information to answer the question raised by the query is evaluated from a plurality dimensions, such that page information that can answer the question raised by the query is displayed to the user, thus avoiding a process of one-by-one viewing of the user, and solving the technical problem of low search efficiency in related art.

To realize the above embodiments, the present disclosure further provides a search device for asking type query.

FIG. 3 is a block diagram of a search device for asking type query based on deep question and answer according to an embodiment of the present disclosure. As shown in FIG. 3, the search device includes an identifying module 31, a searching module 32, an analysis module 33, a ranking module 34, and a displaying module 35.

The identifying module 31 is configured to identify a query, and to determine that the query is an asking type query.

The searching module 32 is configured to search for multiple pieces of page information matching the query from a database.

The database is an off-line database. Page information recorded in the database includes entity data obtained by performing entity extraction on pages, and/or, paragraphing data obtained by extracting paragraphs containing an answer from the pages, and/or, structured data obtained by organizing paragraphs containing an question and paragraphs containing an answer in a preset structure.

The analysis module 33 is configured to perform multi-characteristic analysis on each piece of page information according to characteristics, to obtain a characteristic score of each of the characteristics.

The characteristics are used for evaluating an effectiveness of the page information for answering a question raised by the query.

The ranking module 34 is configured to rank the multiple pieces of page information according to the characteristic score of each of the characteristics.

In detail, the ranking module 34 is configured to obtain a total score of each piece of page information by calculating a weighted sum of the characteristic scores of respective characteristics, and rank the multiple pieces of page information according to the total scores, wherein weights corresponding to the position characteristic and the length characteristic are degrees of search correlation for indicating a matching degree of the query and the page information.

Or, the ranking module 34 is configured to input the characteristic scores of the characteristics into a ranking model pre-trained according to ranking requirement of the user, to obtain a rank of the multiple pieces of page information.

The displaying module 35 is configured to display the multiple pieces of page information according to a ranking result.

In embodiments of the present disclosure, the search device identifies the query, and after determining that query is an asking type query, searches for multiple pieces of page information matching the query in the database, and then performs the multi-characteristic analysis on each piece of page information according to characteristics to obtain the characteristic score of each of the characteristics, ranks the page information according to the characteristic score of each of the characteristics, and displays ranked page information. A plurality of characteristics are used to evaluate the effectiveness of the page information of each piece of page information for answering the question raised by the query from a plurality of dimensions, such that page information that can answer the question raised by the query is displayed to the user, thus avoiding a one-by-one viewing process of the user, and solving the technical problem of low search efficiency in related art.

Based on the above embodiment, the characteristics in this embodiment may include a deep convolution neural network characteristic, a numerical characteristic, an aggregation characteristic, an entity characteristic, an alignment characteristic, a length characteristic, and a position characteristic.

Figure 4:
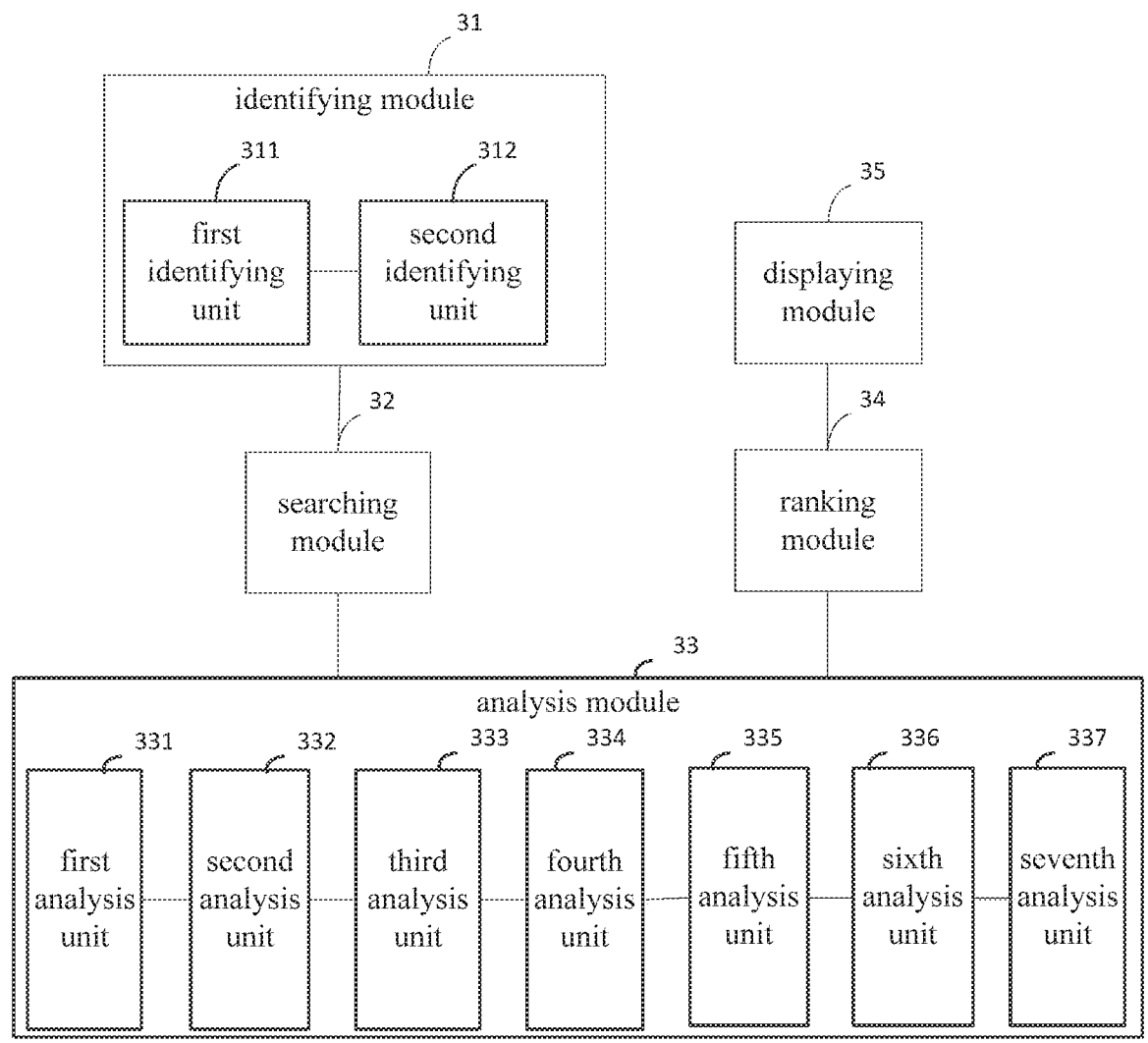
FIG. 4 is a block diagram of a search device for asking type query based on deep question and answer according to another embodiment of the present disclosure.

Based on this, FIG. 4 is a block diagram of a search device for asking type query based on deep question and answer according to another embodiment of the present disclosure. As shown in FIG. 4, the analysis module 33 includes a first analysis unit 331, a second analysis unit 332, a third analysis unit 333, a fourth analysis unit 334, a fifth analysis unit 335, a sixth analysis unit 336, and a seventh analysis unit 337.

The first analysis unit 331 is configured to perform a question-answer match through a deep convolutional neural network according to words in the page information and the query, to determine a first characteristic score of the page information, wherein the deep convolutional neural network has previously learned matching degrees between questions and answers.

The second analysis unit 332 is configured to extract a numerical answer in each piece of page information according to a measuring unit when the answer to the question raised by the query is in a form of number; to perform single-pass clustering on extracted numerical answers and to obtain a score of each cluster if a numerical answer corresponding to the query is an approximate number; to perform literal clustering on the extracted numerical answers and to obtain a score of each cluster if the numerical answer corresponding to the query is a definite number; and to take the score of each cluster as a second characteristic score of page information containing the numerical answer in each cluster respectively.

The third analysis unit 333 is configured to score words contained in the page information by an algorithm of computing an appearance frequency of each of the words, to obtain a score for indicating the appearance frequency of each of the words; and to determine a third characteristic score of page information containing the word according to the score for indicating the appearance frequency of the word.

The fourth analysis unit 334 is configured to estimate a search intention of a user according to the question raised by the query; and to cluster entities in the page information according to entity data in the page information, to obtain a fourth characteristic score for indicating a degree of each entity data satisfying the search intention.

The fifth analysis unit 335 is configured to align the query with paragraphs in the page information by using an alignment model, to obtain a fifth characteristic score of page information containing the paragraphs, wherein the alignment model has previously learned word alignment situation of words in questions and answers.

The sixth analysis unit 336 is configured to analyze the length characteristic of the page information, to obtain a sixth characteristic score for indicating richness of content contained in the page information.

The seventh analysis unit 337 is configured to analyze the position characteristic of the page information, to obtain a seventh characteristic score for indicating a ranking situation of the page information in the multiple pieces of page information matching the query, wherein the ranking is based on a matching degree between the query and the page information.

Further, in a possible implementation of the present disclosure, as shown in FIG. 4, the identifying module 31 includes a first identifying unit 311 and a second identifying unit 312.

The first identifying unit 311 is configured to identify whether the query is the asking type query according to an interrogative word contained in the query, and/or a question-and-answer type ending word contained in the query, and/or a ratio of question-and-answer pages in pages matching the query.

The second identifying unit 312 is configured to identify an asking type of the query and/or whether answer to the query is unique by using a pre-trained support vector machine model for the asking type query.

In embodiments of the present disclosure, the search device identifies the query, and after determining that query is an asking type query, searches for multiple pieces of page information matching the query in the database, and then performs the multi-characteristic analysis on each piece of page information according to characteristics to obtain the characteristic score of each of the characteristics, ranks the page information according to the characteristic score of each of the characteristics, and displays ranked page information. A plurality of characteristics are used to evaluate the effectiveness of the page information of each piece of page information for answering the question raised by the query from a plurality of dimensions, such that page information that can answer the question raised by the query is displayed to the user, thus avoiding a one-by-one viewing process of the user, and solving the technical problem of low search efficiency in related art.

To realize the above embodiments, the present disclosure further provides another search device for asking type query, including a processor and a memory for storing instructions executable by the processor.

The processor is configured to: identify a query, and determine that the query is an asking type query; search for multiple pieces of page information matching the query from a database; perform multi-characteristic analysis on the multiple pieces of page information according to characteristics, to obtain a characteristic score of each of the characteristics, wherein the characteristics are used for evaluating effectiveness of the page information for answering a question raised by the query; rank the multiple pieces of page information according to the characteristic score of each of the characteristics; and display ranked page information.

To realize the above embodiments, the present disclosure further provides a non-transitory computer-readable storage medium having stored therein instructions that, when executed by a processor, cause the processor to perform a search method for an asking type query, the method including: identifying a query, and determining that the query is an asking type query; searching for page information matching the query from a database; performing multi-characteristic analysis on the page information according to characteristics, to obtain a characteristic score of each of the characteristics, wherein the characteristics are used for evaluating effectiveness of the page information for answering a question raised by the query; ranking the page information according to the characteristic score of each of the characteristics; and displaying ranked page information.

To realize the above embodiments, the present disclosure further provides a program product, the program product has stored therein instructions that, when executed by a processor, performs a search method for an asking type query, the method including: identifying a query, and determining that the query is an asking type query; searching for page information matching the query from a database; performing multi-characteristic analysis on the page information according to characteristics, to obtain a characteristic score of each of the characteristics, wherein the characteristics are used for evaluating effectiveness of the page information for answering a question raised by the query; ranking the page information according to the characteristic score of each of the characteristics; and displaying ranked page information.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A search method for asking type query based on deep question and answer, comprising:
    identifying a query, and determining that the query is an asking type query;
    searching for multiple pieces of page information matching the query in a database;
    performing multi-characteristic analysis on each piece of page information according to characteristics, to obtain a characteristic score of each of the characteristics, wherein the characteristics are used to evaluate an effectiveness of each piece of page information for answering a question raised by the query;
    ranking the multiple pieces of page information according to the characteristic score of each of the characteristics; and
    displaying the multiple pieces of page information according to a ranking result,
    wherein identifying a query, and determining whether the query is an asking type query comprises:
    identifying whether the query is the asking type query according to a ratio of question-and-answer pages in pages matching the query, wherein, identifying whether the query is the asking type query according to a ratio of question-and-answer pages in pages matching the query comprises:

determining whether there are a high portion of question-and-answer type pages in the search result of the query; and when there are a high portion of question-and-answer type pages in the search result, identifying the query as being the asking type query.

2. The search method according to claim 1, wherein the database is an off-line database, and page information recorded in the database comprises at least one of:
 entity data obtained by performing entity extraction on pages;
 paragraphing data obtained by extracting paragraphs containing an answer from the pages; and
 structured data obtained by organizing paragraphs containing an question and paragraphs containing an answer in a preset structure.

3. The search method according to claim 1, wherein the characteristics comprise a deep convolutional neural network characteristic, and performing multi-characteristic analysis on each piece of page information according to characteristics, to obtain a characteristic score of each of the characteristics comprises:
 performing a question-answer match through a deep convolutional neural network according to words in the page information and the query, to determine a first characteristic score of the page information, wherein the deep convolutional neural network has previously learned matching degrees between questions and answers.

4. The search method according to claim 1, wherein the characteristics comprises a numerical characteristic, and performing multi-characteristic analysis on each piece of page information according to characteristics, to obtain a characteristic score of each of the characteristics comprises:
 when the answer to the question raised by the query is in a form of number, extracting a numerical answer in each piece of page information according to a measuring unit;
 if the numerical answer corresponding to the query is an approximate number, performing single-pass clustering on the numerical answer, and obtaining a score of each cluster;
 if the numerical answer corresponding to the query is a definite number, performing literal clustering on the numerical answer, and obtaining a score of each cluster;
 taking the score of each cluster as a second characteristic score of the page information containing the numerical answer in each cluster.

5. The search method according to claim 1, wherein the characteristics comprise an aggregation characteristic, and performing multi-characteristic analysis on each piece of page information according to characteristics, to obtain a characteristic score of each of the characteristics comprises:
 scoring words contained in the page information by computing an appearance frequency of each of the words, to obtain a score for indicating the appearance frequency of each of the words;
 determining a third characteristic score of the page information containing the word according to the score for indicating the appearance frequency of the word.

6. The search method according to claim 1, wherein the characteristics comprises an entity characteristic, performing multi-characteristic analysis on each piece of page information according to characteristics, to obtain a characteristic score of each of the characteristics comprises:

estimating a search intention of a user according to the question raised by the query;
 clustering entities in the page information according to entity data in the page information, to obtain a fourth characteristic score for indicating a degree of each entity data satisfying the search intention.

7. The search method according to claim 1, wherein the characteristics comprise an alignment characteristic, performing multi-characteristic analysis on each piece of page information according to characteristics, to obtain a characteristic score of each of the characteristics comprises:
 aligning the query with paragraphs in the page information by using an alignment model, to obtain a fifth characteristic score of the page information containing the paragraphs, wherein the alignment model has previously learned word alignment situation of words in questions and answers.

8. The search method according to claim 1, wherein the characteristics comprise a length characteristic, performing multi-characteristic analysis on each piece of page information according to characteristics, to obtain a characteristic score of each of the characteristics comprises:
 analyzing the length characteristic of the page information, to obtain a sixth characteristic score for indicating richness of content contained in the page information.

9. The search method according to claim 1, wherein the characteristics comprise a position characteristic, performing multi-characteristic analysis on each piece of page information according to characteristics, to obtain a characteristic score of each of the characteristics comprises:
 analyzing the position characteristic of the page information, to obtain a seventh characteristic score for indicating a ranking situation of the page information in the multiple pieces of page information matching the query, wherein the multiple pieces of page information are ranked according to a matching degree between the query and the page information.

10. The search method according to claim 1, after identifying that the query is the asking type query, further comprising:
 identifying an asking type of the query and/or whether answer to the query is unique by using a pre-trained support vector machine model.

11. The search method according to claim 1, wherein ranking the multiple pieces of page information according to the characteristic score of each of the characteristics comprises:
 obtaining a total score of each piece of page information by calculating a weighted sum of the characteristic scores of the characteristics, and ranking the multiple pieces of page information according to the total scores, wherein weights corresponding to the position characteristic and the length characteristic are degrees of search correlation for indicating a matching degree of the query and the page information;
 or, inputting the characteristic scores of the characteristics into a ranking model pre-trained according to ranking requirement of the user, to obtain a rank of the multiple pieces of page information.

12. A search device for asking type query based on deep question and answer, comprising:
 one or more processors,
 a memory,
 one or more software modules, stored in the memory, executable by the one or more processors, and comprising:

an identifying module, configured to identify a query, and to determine that the query is an asking type query;

a searching module, configured to search for multiple pieces of page information matching the query from a database;

an analysis module, configured to perform multi-characteristic analysis on each piece of page information according to characteristics, to obtain a characteristic score of each of the characteristics, wherein the characteristics are used for evaluating an effectiveness of each piece of page information for answering a question raised by the query;

a ranking module, configured to rank the multiple pieces of page information according to the characteristic score of each of the characteristics; and a displaying module, configured to display ranked page information, wherein the identifying module comprises:

a first identifying unit, configured to identify whether the query is the asking type query according to a ratio of question-and-answer pages in pages matching the query, wherein, when the first identifying unit is configured to identify whether the query is the asking type query according to a ratio of question-and-answer pages in pages matching the query, the first identifying unit is configured to:

determine whether there are a high portion of question-and-answer type pages in the search result of the query; and when there are a high portion of question-and-answer type pages in the search result, identify the query as being the asking type query.

13. The search device according to claim 12, wherein the database is an off-line database, page information recorded in the database comprises at least one of:

entity data obtained by performing entity extraction on pages;

paragraphing data obtained by extracting paragraphs containing an answer from the pages;

structured data obtained by organizing paragraphs containing an question and paragraphs containing an answer in a preset structure.

14. The search device according to claim 12, wherein the characteristics comprise a deep convolutional neural network characteristic, the analysis module comprises:

a first analysis unit, configured to perform a question-answer match through a deep convolutional neural network according to words in the page information and the query, to determine a first characteristic score of the page information, wherein the deep convolutional neural network has previously learned matching degrees between questions and answers.

15. The search device according to claim 12, wherein the characteristics comprise a numerical characteristic, and the analysis module comprises:

a second analysis unit, configured to extract a numerical answer in each piece of page information according to a measuring unit when the answer to the question raised by the query is in a form of number; to perform single-pass clustering on extracted numerical answer and to obtain a score of each cluster if a numerical answer corresponding to the query is an approximate number; to perform literal clustering on the extracted numerical answer and to obtain a score of each cluster if the numerical answer corresponding to the query is a definite number; and to take the score of each cluster as a second characteristic score of page information containing the numerical answer in each cluster respectively.

16. The search device according to claim 12, wherein the characteristics comprise an aggregation characteristic, and the analysis module comprises:

a third analysis unit, configured to score words contained in the page information by computing an appearance frequency of each of the words, to obtain a score for indicating the appearance frequency of each of the words, and to determine a third characteristic score of page information containing the word according to the score for indicating the appearance frequency of the word.

17. The search device according to claim 12, wherein the characteristics comprises an entity characteristic, and the analysis module comprises:

a fourth analysis unit, configured to estimate a search intention of a user according to the question raised by the query; and to cluster entities in the page information according to entity data in the page information, to obtain a fourth characteristic score for indicating a degree of each entity data satisfying the search intention.

18. The search device according to claim 12, wherein characteristics comprise an alignment characteristic, and the analysis module comprises:

a fifth analysis unit, configured to align the query with paragraphs in the page information by using an alignment model, to obtain a fifth characteristic score of page information containing the paragraphs, wherein the alignment model has previously learned word alignment situation of words in questions and answers.

19. The search device according to claim 12, wherein the characteristics comprise a length characteristic, and the analysis module comprises:

a sixth analysis unit, configured to analyze the length characteristic of the page information, to obtain a sixth characteristic score for indicating richness of content contained in the page information.

20. The search device according to claim 12, wherein the characteristics comprise a position characteristic, and the analysis module comprises:

a seventh analysis unit, configured to analyze the position characteristic of the page information, to obtain a seventh characteristic score for indicating a ranking situation of the page information in the multiple pieces of page information matching the query, wherein the ranking is according to a matching degree between the query and the page information.

21. The search device according to claim 12, wherein the identifying module further comprises:

a second identifying unit, configured to identify an asking type of the query and/or whether the answer to the query is unique by using a pre-trained support vector machine model for the asking type query.

22. The search device according to claim 12, wherein the ranking module is configured to:

obtain a total score of each piece of page information by calculating a weighted sum of the characteristic scores of the characteristics, and rank the multiple pieces of page information according to the total scores, wherein weights corresponding to the position characteristic and the length characteristic are degrees of search correlation for indicating a matching degree of the query and the page information; or input the characteristic scores of the characteristics into a ranking model pre-trained according to ranking requirement of the user, to obtain a rank of the multiple pieces of page information.

\* \* \* \* \*